(12) United States Patent
Kholodkov et al.

(10) Patent No.: US 12,474,921 B2
(45) Date of Patent: Nov. 18, 2025

(54) MULTI-MODAL ARTIFICIAL INTELLIGENCE ROOT CAUSE ANALYSIS

(71) Applicant: Microsoft Technology Licensing, LLC, Redmond, WA (US)

(72) Inventors: Dmitry Valentinovich Kholodkov, Sammamish, WA (US); Randee Bierlein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 18/500,211

(22) Filed: Nov. 2, 2023

(65) Prior Publication Data

US 2025/0147754 A1    May 8, 2025

(51) Int. Cl.
*G06F 8/70* (2018.01)
*G06F 11/07* (2006.01)
*G06F 40/20* (2020.01)

(52) U.S. Cl.
CPC .............. *G06F 8/70* (2013.01); *G06F 11/079* (2013.01); *G06F 40/20* (2020.01)

(58) Field of Classification Search
None
See application file for complete search history.

(56) References Cited

U.S. PATENT DOCUMENTS

| | | | |
|---|---|---|---|
| 8,001,527 B1 | 8/2011 | Qureshi et al. | |
| 8,839,188 B2 | 9/2014 | Chen et al. | |
| 10,073,683 B2 * | 9/2018 | Prasad | G06F 11/0751 |
| 10,949,623 B2 | 3/2021 | Galitsky | |
| 11,243,835 B1 * | 2/2022 | Chan | G06F 11/0751 |
| 11,762,763 B2 | 9/2023 | De Sousa Bispo et al. | |
| 11,915,107 B2 * | 2/2024 | Santhanagopal | G06N 20/00 |

(Continued)

FOREIGN PATENT DOCUMENTS

WO    WO-2018127304 A1 *   7/2018   ............... G06N 7/01

OTHER PUBLICATIONS

Kiciman et al., "Causal Reasoning and Large Language Models: Opening a New Frontier for Causality," arXiv, 2023, 42pg. (Year: 2023).*

(Continued)

*Primary Examiner* — Ryan D. Coyer
(74) *Attorney, Agent, or Firm* — Han Gim; Newport IP, LLC

(57) ABSTRACT

A data processing system implements obtaining build logs that include information associated with a software build problem; analyzing the logs to generate a knowledge graph identifying the relationship between various entities in the logs; extracting a signature of a candidate root cause of the build problem from the knowledge graph representing a subset of nodes and edges of the knowledge graph; providing the signature of the candidate root cause to a graphical language model to obtain a prediction of a category of root cause failure selected from among a plurality of root cause failures; constructing a prompt for a language model to generate a root cause failure analysis that describes the root cause of the build problem, the prompt including the category of root cause; receiving the root cause failure analysis from the language model; and performing one or more actions in response to receiving the root cause failure analysis.

20 Claims, 9 Drawing Sheets

(56) References Cited

U.S. PATENT DOCUMENTS

| | | | | |
|---|---|---|---|---|
| 2005/0097396 | A1* | 5/2005 | Wood | G06F 11/2252 |
| | | | | 714/25 |
| 2015/0033077 | A1* | 1/2015 | Bhamidipaty | G06F 11/0751 |
| | | | | 714/37 |
| 2018/0314953 | A1 | 11/2018 | Benedict et al. | |
| 2021/0026723 | A1* | 1/2021 | Nadger | G06F 11/3409 |
| 2021/0026724 | A1* | 1/2021 | Nadger | G06F 11/3452 |
| 2022/0334904 | A1* | 10/2022 | Chesneau | G06F 11/0793 |
| 2022/0358005 | A1* | 11/2022 | Saha | G06F 40/216 |
| 2023/0050889 | A1 | 2/2023 | Kumar Jaya Kumar | |
| 2023/0251923 | A1* | 8/2023 | Moyal | G05B 23/0275 |
| | | | | 714/15 |
| 2024/0248784 | A1* | 7/2024 | Chesneau | G06N 20/10 |
| 2024/0330096 | A1* | 10/2024 | Jha | G06F 11/3089 |
| 2024/0362105 | A1* | 10/2024 | Barnes | G06F 11/079 |
| 2025/0077851 | A1* | 3/2025 | Garapati | G06N 3/0499 |

OTHER PUBLICATIONS

Wang et al., "KECP: Knowledge Enhanced Contrastive Prompting for Few-shot Extractive Question Answering," arXiv, 2022, 12pg. (Year: 2022).*

International Search Report and Written Opinion received for PCT Application No. PCT/US2024/052168, (MS# 413721-PCT01) mailed on Jan. 17, 2025, 17 pages.

Liu, et al., "LogPrompt: Prompt Engineering Towards Zero-Shot and Interpretable Log Analysis", arXiv:2308.07610v1, Aug. 15, 2023, 12 pages.

Behera, et al., "Root Cause Analysis Bot using Machine Learning Techniques", Retrieved From: https://www.techrxiv.org/articles/preprint/Root_Cause_Analysis_Bot_using_Machine_Learning_Techniques/21588159/1, Nov. 11, 2022, 13 Pages.

Berti, et al., "Leveraging Large Language Models (LLMs) for Process Mining (Technical Report)", In Repository of arXiv:2307.12701v1, Jul. 24, 2023, 59 Pages.

Blöbaum, et al., "Root Cause Analysis with DoWhy, an Open Source Python Library for Causal Machine Learning", Retrieved from: https://aws.amazon.com/blogs/opensource/root-cause-analysis-with-dowhy-an-open-source-python-library-for-causal-machine-learning/, Jan. 11, 2023, 15 Pages.

Chen, et al., "Empowering Practical Root Cause Analysis by Large Language Models for Cloud Incidents", In Repository of arXiv:2305.15778v3, May 31, 2023, 15 Pages.

Kahles, et al., "Automating Root Cause Analysis via Machine Learning in Agile Software Testing Environments", In Proceedings of 12th IEEE Conference on Software Testing, Validation and Verification, Jun. 2019, 12 Pages.

* cited by examiner

File   Edit   Insert   Format   View         | Search |

Root Cause Failure Analysis – Build 12.32.1

Build 12.32.1 failed due to a reference to a reference to a missing library file XYZ.lib.

To correct this issue, ensure that XYZ.lib has been stored in the libraries folder in the build environment. Also ensure that the permissions are set correct so that the build process can access this folder and the XYZ.iib file stored therein.

MULTI-MODAL ARTIFICIAL INTELLIGENCE ROOT CAUSE ANALYSIS

BACKGROUND

Software continues to become increasingly complex, and determining a root cause of a problem with the software during execution or build time has become a time consuming and complex problem. The logs that are generated during a build of the software and/or during execution of the software are often extensive, making it impractical for engineers to manually review the logs to attempt to identify a root cause of a problem with the software. Unsuccessful attempts have been made to automate the analysis of these logs using a large language model (LLM). However, the extensive size of the logs typically exceeds the size of the prompts for an LLM. Furthermore, changes to the prompt structure and/or the structure of the logs can cause the automated analysis to result in failure. Yet another problem is that the LLM sometimes hallucinates false root causes of problems, which can lead engineers attempting to fix the problem to waste time investigating an incorrect root cause of the problem. Hence, there is a need for improved systems and methods that provide a technical solution for using artificial intelligence for root cause analysis.

SUMMARY

An example data processing system according to the disclosure includes a processor and a machine-readable medium storing executable instructions. The instructions when executed cause the processor alone or in combination with other processors to perform operations including obtaining build logs that include information associated with a software build that experienced a build problem; generating a knowledge graph by analyzing the build logs using a knowledge graph generation unit, the knowledge graph identifying a relationship between various entities in the build logs; extracting a signature of a candidate root cause of the build problem from the knowledge graph, the signature representing a subset of nodes and edges of the knowledge graph; providing the signature of the candidate root cause to a graphical language model to obtain a prediction of a category of root cause failure, the graphical language model being trained to receive the signature of the candidate root cause and to predict a category of root cause failure from among a plurality of root cause failures based on the signature of the candidate root cause; constructing a prompt for a language model using a prompt construction unit, the prompt instructing the language model to generate a root cause failure analysis that describes the root cause of the build problem, the prompt including the category of root cause predicted by the graphical language model; providing the prompt as an input to the language model; receiving the root cause failure analysis from the language model; and performing one or more actions in response to receiving the root cause failure analysis.

An example method implemented in a data processing system includes obtaining build logs that include information associated with a software build that experienced a build problem; generating a knowledge graph by analyzing the build logs using a knowledge graph generation unit, the knowledge graph identifying a relationship between various entities in the build logs; extracting a signature of a candidate root cause of the build problem from the knowledge graph, the signature representing a subset of nodes and edges of the knowledge graph; providing the signature of the candidate root cause to a graphical language model to obtain a prediction of a category of root cause failure, the graphical language model being trained to receive the signature of the candidate root cause and to predict a category of root cause failure from among a plurality of root cause failures based on the signature of the candidate root cause; constructing a prompt for a language model using a prompt construction unit, the prompt instructing the language model to generate a root cause failure analysis that describes the root cause of the build problem, the prompt including the category of root cause predicted by the graphical language model; providing the prompt as an input to the language model; receiving the root cause failure analysis from the language model; and performing one or more actions in response to receiving the root cause failure analysis.

An example data processing system according to the disclosure includes a processor and a machine-readable medium storing executable instructions. The instructions when executed cause the processor alone or in combination with other processors to perform operations including obtaining logs that include information associated with a problem with software; generating a knowledge graph by analyzing the logs using a knowledge graph generation unit, the knowledge graph identifying a relationship between various entities in the logs; extracting a signature of a candidate root cause of the problem from the knowledge graph, the signature representing a subset of nodes and edges of the knowledge graph; providing the signature of the candidate root cause to a graphical language model to obtain a prediction of a category of root cause failure, the graphical language model being trained to receive the signature of the candidate root cause and to predict a category of root cause failure from among a plurality of root cause failures based on the signature of the candidate root cause; constructing a prompt for a language model using a prompt construction unit, the prompt instructing the language model to generate a root cause failure analysis that describes the root cause of the problem with the software, the prompt including the category of root cause predicted by the graphical language model; providing the prompt as an input to the language model; receiving the root cause failure analysis from the language model; and performing one or more actions in response to receiving the root cause failure analysis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 5 is a diagram of an example user interface of an application that implements the techniques described herein.

DETAILED DESCRIPTION

Figure 1:
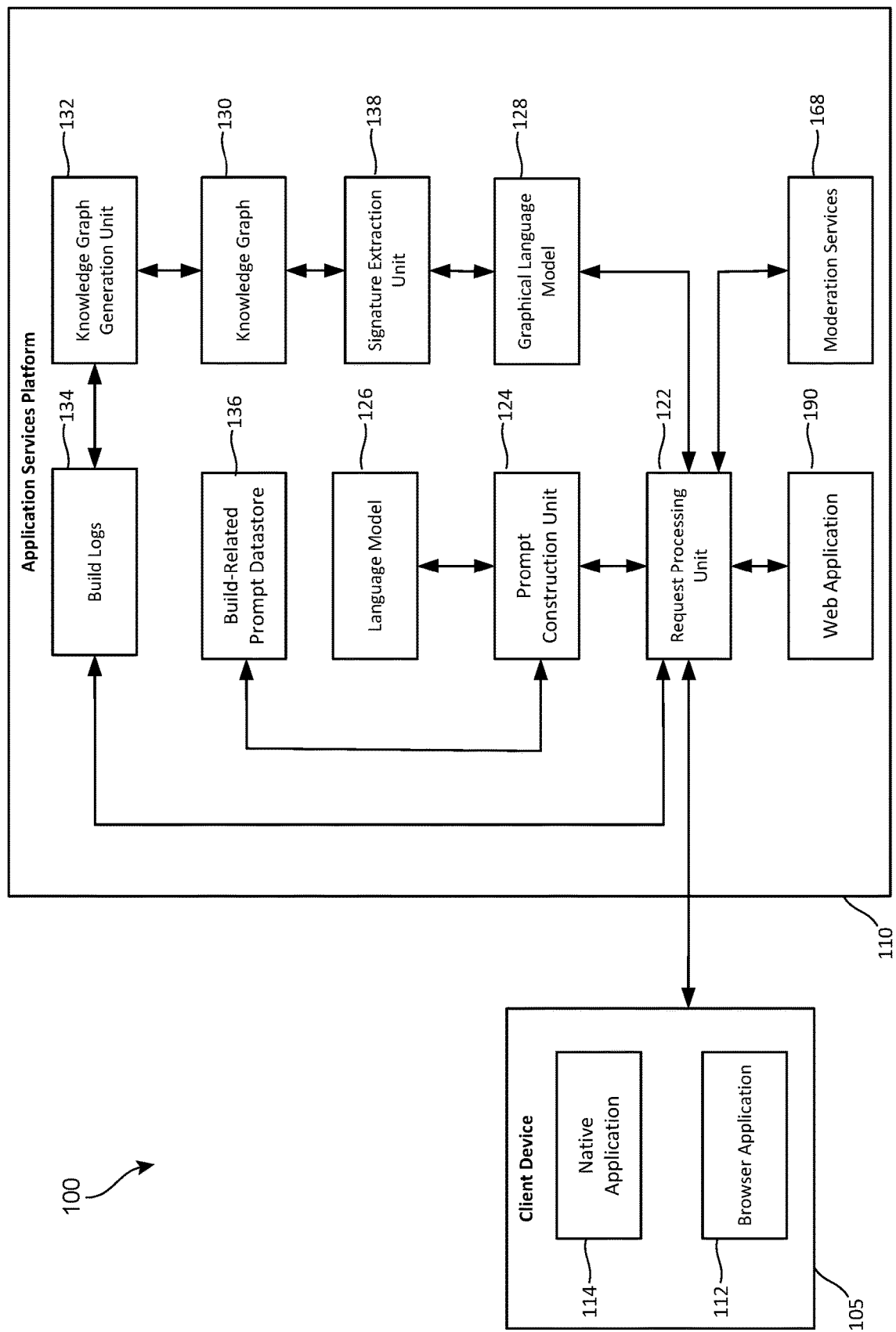
FIG. 1 is a diagram of an example computing environment in which the techniques for AI-driven root cause analysis described herein are implemented.

Systems and methods for using artificial intelligence (AI) for root cause analysis are described herein. These techniques provide a technical solution to the problems associated with current solutions that attempt to utilize an LLM to analyze the logs associated with a software build or execution to attempt to identify a root cause of a problem with the software or the software build by implementing a multi-model approach. The multi-model approach provided herein provides a flexible and durable solution for automating root cause analysis by using two different types of AI models. In an example, these models include a Small Graphical Language Model (SGLM) and an LLM that addresses the shortcomings of the current systems that attempt to use an LLM alone. The techniques include analyzing the logs to generate a knowledge graph that represents relationships between tokens within the logs. These relationships are represented as signatures which provide a representation of these relationships. The SGLM is trained to analyze these signatures to identify predictive features for the root cause and to provide the predictive features to a prompt constructor for the LLM. The prompt constructor generates a prompt for the LLM that is based on the predictive features identified by the SGLM. A technical benefit of this approach is that the SGLM eliminates large amount of irrelevant data from the logs that is not helpful in diagnosing the root cause of the problem with the software. This enables the prompt constructor to construct a prompt for the LLM that is based on the features that are predicted to be related to the root cause of the problem. As a result of this prompt tuning, the LLM generates more relevant predictions and provides more high value insights into the root cause of the problem. A technical benefit of this approach is that that the predictions by the SGLM can be used to determine whether the LLM is hallucinating. The SGLM has a high level of precision and accuracy when predicting the type of failure that is the root cause of the problem. The SGLM predictions are used both to construct the prompt to the LLM and to determine whether the output from the LLM is consistent with the prediction output by the SGLM. Another technical benefit of this approach is that the SGLM is not dependent on the logs having a particular format or having any preprocessing or formatting performed. Instead, the SGLM relies on relationships between tokens included in the logs that are represented in the knowledge graph to identify root problems. Therefore, changes to the format of the logs will not cause the techniques provided herein to fail and the raw format of the logs can be ingested without any preprocessing or formatting. Another technical benefit of this approach is that the SGLM can detect new types of failures associated with the software execution or software build that have not previously occurred without having to be specifically trained or fine-tuned to recognize these types of failures. Consequently, the techniques can adapt to new types of failures that are root cause of a problem. Yet another benefit of the techniques here is that these techniques improve the efficiency of computing systems by identifying and addressing failures more efficiently. These and other technical benefits of the techniques disclosed herein will be evident from the discussion of the example implementations that follow.

FIG. 1 is a diagram of an example computing environment 100 in which the techniques for AI-driven root cause analysis described herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to word processing applications, presentation applications, web site authoring applications, collaboration platforms, communications platforms, and/or other types of applications in which users may create, view, and/or modify various types of electronic content. In the implementation shown in FIG. 1, the program code associated with one or more of the applications and/or services is updated periodically. The program code is updated periodically to include improvements and bug fixes and/or include builds which may be deployed to the application services platform 110. As a new build is generated, information about the progress of the build is written to the build logs 134. Occasionally, a build fails for various reasons. The techniques herein analyze the build logs 134 using multiple AI models to accurately predict a root cause of the problem and provide recommendations for correcting the problem. While the examples discussed herein relate to build logs 134 generated when generating a build of software used by the application services platform 110 and/or the client device 105, the techniques provided herein are not limited to determining the root cause of build related problems. The techniques herein can also be used to diagnose the root cause of runtime errors of the software utilized by the application services platform 110 by analyzing the runtime logs generated by the software while the software is being executed by the application services platform 110. Previously, human engineers would manually analyze the build logs 134 to identify the root cause of the problem associated with the build. However, this approach was a time consuming and challenging process to identify the root cause of the build. The techniques herein provide a technical solution to this problem by using multiple AI models to automatically analyze the log data and predict the root cause of the problem. The client device 105 and the application services platform 110 communicate with each other over a network (not shown). The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

The client device 105 includes a native application 114 and a browser application 112. The native application 114 is a web-enabled native application, in some implementations, that enables users to view, create, and/or modify electronic content. The web-enabled native application utilizes services provided by the application services platform 110 including but not limited to creating, viewing, and/or modifying various types of electronic content and obtaining templates for creating and/or modifying the electronic content. In some implementations, the web-enabled native application provides tools that enable an authorized user to view information about software builds to be generated including selecting which version of program code to include in a particular build. The web-enabled application enables the authorized user to view the build logs 134 associated with a build and root cause analysis predictions made by the graphical language model 128 and the language model 126. The native application 114 implements the user interface 505 shown in FIG. 5, in some implementations. In other implementations, the browser application 112 is used for accessing and viewing web-based content provided by the application services platform 110. In such implementations, the application services platform 110 implements one or more web applications, such as the web application 190, that enables users to view, create, and/or modify electronic content and to obtain template recommendations for creating and/or modifying the electronic content. The web application 190 implements the user interface 505 shown in FIG. 5, in some implementations. In some implementations, the web application 190 provides tools that enable an authorized user to view information about software builds to be generated including selecting which version of program code to include in a particular build. The web-enabled application enables the authorized user to view the build logs 134 associated with a build and root cause analysis predictions made by the graphical language model 128 and the language model 126. The application services platform 110 supports both the native application 114 and a web application 190, in some implementations, and the users may choose which approach best suits their needs.

The application services platform 110 includes a request processing unit 122, a prompt construction unit 124, a language model 126, graphical language model 128, knowledge graph 130, knowledge graph generation unit 132, build logs 134, a build-related prompt datastore 136, a build-related prompt datastore 136, a signature extraction unit 138, the web application 190, and moderation services 168.

The request processing unit 122 is configured to receive requests from the native application 114 of the client device 105 and/or the web application 190 of the application services platform 110. The requests may include but are not limited to requests to create, view, and/or modify various types of electronic content and/or sending natural language prompts to the language model 126 to generate textual content according to the techniques provided herein. The requests may also include requests to access the build logs 134 associated with a build and/or view root cause analysis predictions made by the graphical language model 128 and the language model 126. The request processing unit 122 also coordinates communication and exchange of data among components of the application services platform 110 as discussed in the examples which follow.

The language model 126 is a machine learning model trained to generate textual content in response to natural language prompts input by a user via the native application 114 or via the browser application 112. The language model 126 is implemented using a large language model (LLM), in some implementations. Examples of such models include but are not limited to a Generative Pre-trained Transformer 3 (GPT-3), or GPT-4 model. Other implementations may utilize other models or other generative models to generate textual content according to the writing style of the user. The language model 126 is used to generate root cause analysis information that predicts the cause of problems associated with software builds. As discussed in detail in the examples which follow, the language model 126 works in conjunction with the graphical language model 128 to generate the root cause analysis predictions based on the build logs 134. This generates more accurate predictions than current approaches that rely solely on a language model for root cause analysis. A technical benefit of this approach is that the graphical language model 128 provides contextual information to the language model regarding the predicted category of root cause failure to guide the language model to generate correct root cause analysis and avoid hallucinations by the language model 128 experienced by single model approaches that rely solely on a language model for root cause analysis.

The graphical language model 128 is a machine learning model trained to predict a class of problems that has occurred based on a graphical representation of information extracted from the build logs 134. In contrast with the language model 126 which analyzes textual inputs to generate content, the graphical language model 128 is trained to analyze a graphical input and to output a predicted root cause failure type based on the graphical input. The graphical language model 128 is trained to recognize various patterns or signatures in the graphical input that represent various failure types that may be encountered in the build logs 134. A technical benefit of the graphical language model 128 is that the graphical language model 128 is a SGLM that can be trained on a very small number of samples and has a significant yield of predictive power to weight ratio.

Figure 3:
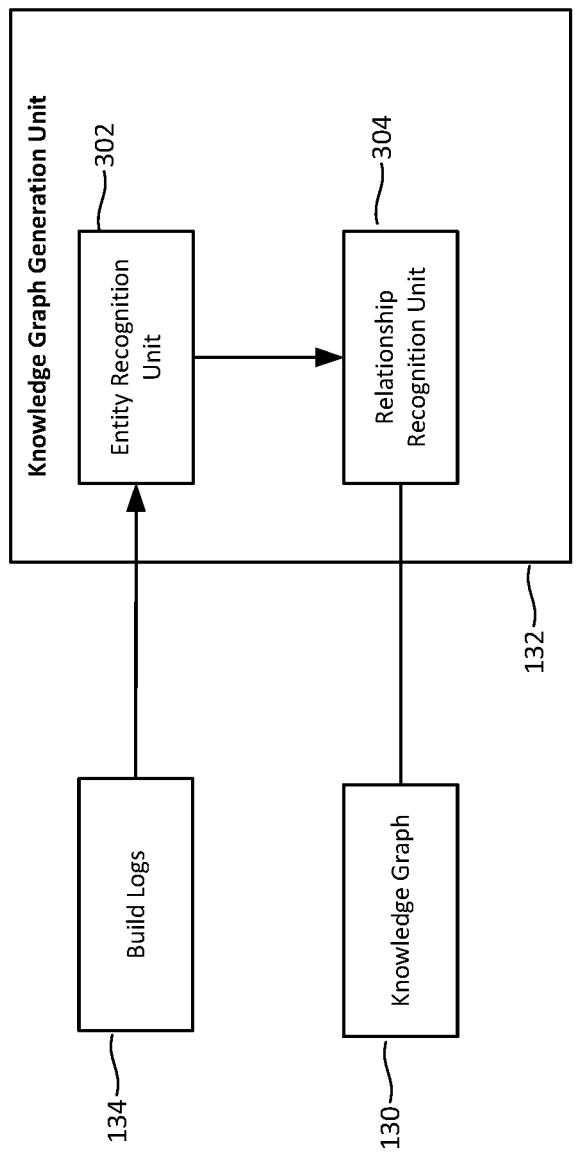
FIG. 3 is a diagram showing additional features of the knowledge graph generation unit shown in FIG. 1.

The knowledge graph generation unit 132 is configured to access the build logs 134 associated with a build that had a problem and to generate the knowledge graph 130 based on the build logs 134. The knowledge graph generation unit 132 can be implemented using various techniques for generating the knowledge graph 130 from the build logs 134. The knowledge graph 130 includes nodes representing tokens extracted from the build logs 134 and connections between these nodes that indicate a relationship between the nodes. The knowledge graph 130 provides a means for organizing the data in the build logs 134 and for identifying patterns within the data included in the build logs 134 that are indicative of root cause failure of a software build. Similar knowledge graphs may be generated for other types of logs, such as logs that capture runtime error information for software being executed. The build logs 134 are typically textual logs that include specified types of information about events that occur during the build process. The information is typically written to the logs sequentially and includes a timestamp indicating a date and time when the event occurred. The event information may include various types of information messages indicating that various specific tasks associated with the build process have been completed and/or error messages that specific tasks associated with the build process failed. The format of the build logs 134 can vary from implementation to implementation. In some implementations, the build logs 134 are JavaScript Object Notation (JSON) logs which are in an open standard file format and data interchange format that uses human-readable text. An example implementation of the knowledge graph generation unit 132 is shown in FIG. 3.

Furthermore, in some implementations, the functionality of the signature extraction unit 138 is implemented by the knowledge graph unit 132, and the knowledge graph unit 132 filters the knowledge graph 130 as the graph is constructed to only include nodes and/or connections that are associated with entities and/or relationships that occur more than a threshold number of times in the build logs 134.

The signature extraction unit 138 is configured to extract signatures of candidates for the root cause of the problem from the knowledge graph 130. The build logs 134 may include significant amounts of information that is irrelevant to predicting the root cause of the problem. Consequently, the knowledge graph constructed by the knowledge graph generation unit 132 may include information that is irrelevant for predicting the root cause of the problem. The signature extraction unit 138 filters the knowledge graph 130 to extract the signatures of the candidates for the root cause of the problem. These signatures represent a subset of the knowledge graph that includes a subset of the nodes and connections between the nodes of the knowledge graph 130. The irrelevant data included in the build logs 134 and the knowledge graph 130 can create noise that makes it more difficult for the graphical language model 128 to distinguish between different categories of root cause failures. The signature extraction unit 138 addresses this problem by applying dynamic noise suppression to the information included in the knowledge graph 130. One approach that the signature extraction unit 138 may use is to generate the signatures is to eliminate nodes and/or connections between nodes for relationships that do not occur more than a threshold number of times within the data. A technical benefit of this approach is that it eliminates nodes and/or connections from the knowledge graph that are referenced less than the threshold number of times, which indicates that these elements of the knowledge graph 130 are likely to represent features from the build logs 134 that are unrelated to the root cause failure.

The signature extraction unit 138 provides the signature generated for the knowledge graph 130 as an input to the graphical language model 128 and the graphical language model 128 outputs a predicted category of root cause failure. In some instances, a new type of root cause failure may occur that has not yet been labeled. The graphical language model 128 outputs an indication that the root cause problem could not be classified, and the request processing unit 122 can generate a request for a human user to review the build log information 134, the signature information extracted by the signature extraction unit 138, and/or other information that may be relevant for assessing whether a new category of root cause failure has been detected. The human user can review the information provided by the request processing unit 122 via a user interface provided by the native application 114 and/or the web application 190. The human user may determine that a new category of root cause failure has been identified and input a label for that root cause failure. The native application 114 and/or the web application 190 generates new training data for the graphical language model 128 to fine-tune the training of the model to recognize the new category of root cause failure. Otherwise, if the human user determines that the root cause failure belongs to an existing category of root cause failure, the native application 114 and/or the web application 190 can generate training data for the graphical language model 128 to fine-tune the training of the graphical language model 128 to recognize that category of root cause failure in the future.

The moderation services 168 analyze natural language prompts provided to the language model 126 and content generated by the language model 126 to ensure that neither the natural language prompt nor the content generated by the language model 126 contain potentially objectionable or offensive content. Additional details of the moderation services 168 are shown in the example implementation shown in FIG. 2.

The build-related prompt datastore 136 is a persistent datastore in the memory of the application services platform 110 that stores the build-related queries that are submitted to the language model 126. The natural language prompt generated by the prompt construction unit 124 and the content generated by the language model 126 in response to the prompt is stored in the build-related prompt datastore 136. Additional information may also be stored in the build-related prompt datastore 136 in other implementations. The build-related prompt database 136 enables a user to review the prompts that have been previously submitted when researching a root cause of a build problem, a software runtime problem, and/or other type of problem. The user may review the root cause analysis generated by the language model 126 for similar problems that have occurred in the past. The root cause analysis includes a description of the root cause failure and a description of steps that can be taken to recover from the root cause failure.

Figure 2:
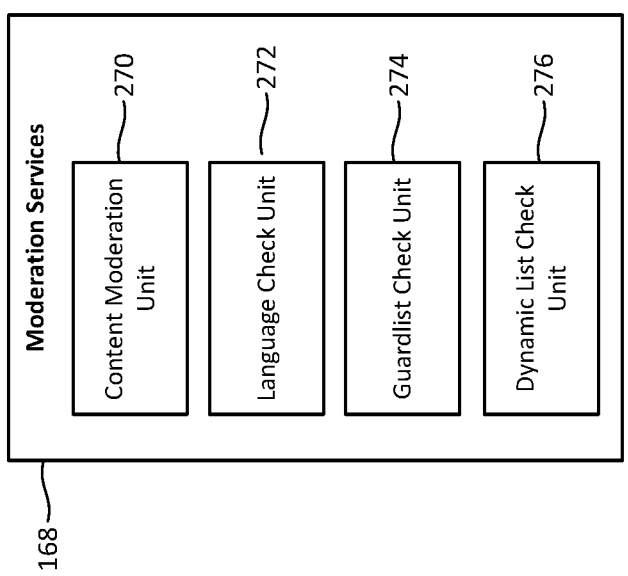
FIG. 2 is an example implementation of the moderation services shown in FIG. 1.

FIG. 2 is an example implementation of the moderation services 168 shown in FIG. 1. The moderation services 168 analyze the natural language prompt and textual content generated by the language model 126 to ensure that potentially objectionable or offensive content is not generated or utilized by the application services platform 110. If potentially objectionable or offensive content is detected, the moderation services 168 provides a blocked content notification to the client device 105 indicating that the natural language prompt, the content generated by the language model 126, and/or the sample content included content that is blocked.

The moderation services 168 performs several types of checks on the electronic content item being accessed or modified by the user in the native application 114 or the web application 190, the natural language prompt input by the user, and/or content generated by the language model 126. The content moderation unit 270 is implemented by a machine learning model trained to analyze the textual content of these various inputs to perform a semantic analysis on the textual content to predict whether the content includes potentially objectionable or offensive content. The language check unit 272 performs another check on the textual content using a second model configured to analyze the words and/or phrase used in textual content to identify potentially offensive language. The guard list check unit 274 is configured to compare the language used in the textual content with a list of prohibited terms including known offensive words and/or phrases. The dynamic list check unit 276 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services 168 may vary from implementation to implementation. If one or more of these checks determines that the textual content includes offensive content, the moderation services 168 can notify the application services platform 110 that some action should be taken.

In some implementations, the moderation services 168 generates a blocked content notification, which is provided to the client device 105. The native application 114 or the web application 190 receives the notification and presents a message on a user interface of the application that the request received by the request processing unit 122 could not be processed. The user interface provides information indicating why the blocked content notification was issued in some implementations. The user may attempt to refine the natural language prompt to remove the potentially offensive content. A technical benefit of this approach is that the moderation services 168 provides safeguards against both user-created and model-created content to ensure that prohibited offensive or potentially offensive content is not presented to the user in the native application 114 or the web application 190.

FIG. 3 is a diagram showing additional features of the knowledge graph generation unit 132 shown in FIG. 1. The knowledge graph generation unit 132 generates the knowledge graph 130 from the build logs 134. The knowledge graph generation unit 132 includes an entity recognition unit 302 and a relationship recognition unit 304.

The entity recognition unit 302 identifies entities represented by words or phrases in the build logs 134. The entity recognition unit 302 identifies entities in the build logs 134. In some implementations, the entity recognition unit 302 is implemented by a language model trained to receive a textual input and to output the entities included in the textual input. The language model ingests the build logs 134 and outputs the entities contained therein. The entities output by the entity recognition unit 302 will be the nodes of the knowledge graph 130.

The relationship recognition unit 304 analyzes the entities output by the entity recognition unit 302 and the build logs 134 to identify relationships between the entities. In some implementations, the relationship recognition unit 304 is implemented using a language model that is trained to receive a textual input and a list of the entities for which information is to be determined. The model outputs relationship information for entities that are determined to be related. The relationship information output by the relationship recognition unit 304 become the edges of the knowledge graph 130.

Figure 4:
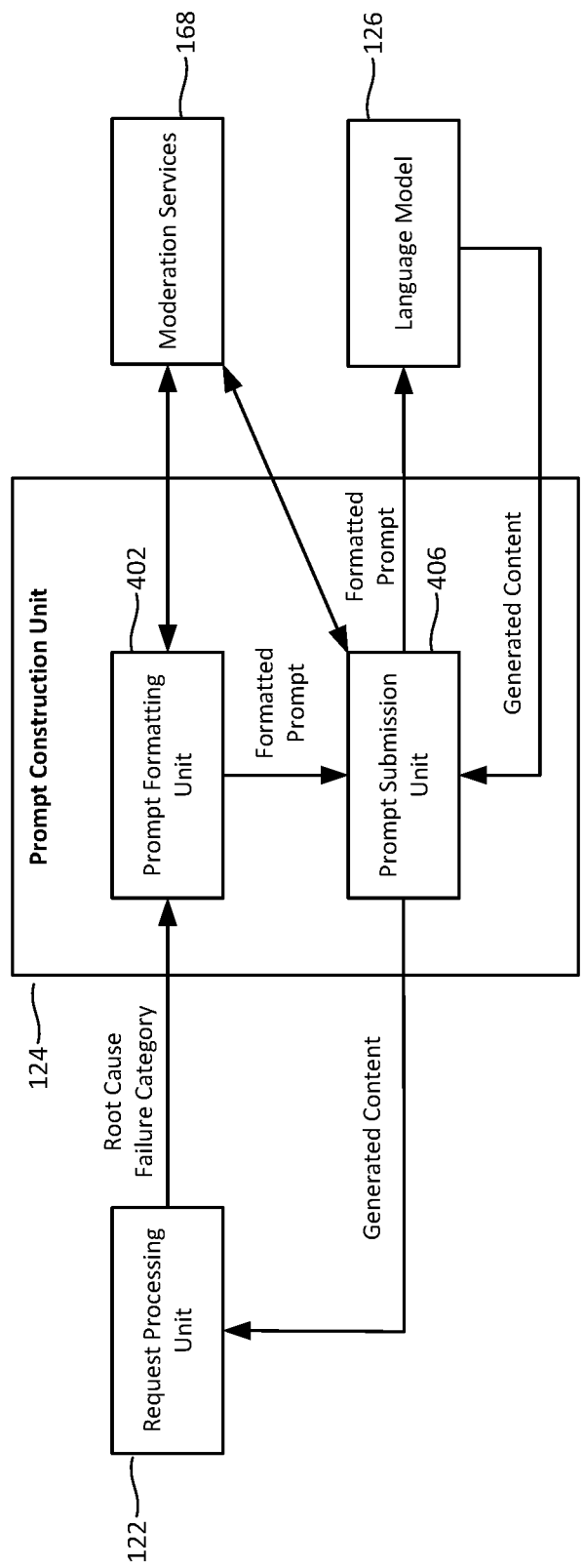
FIG. 4 is a diagram showing additional features of the prompt construction unit shown in FIG. 1.

FIG. 4 is a diagram showing additional features of the prompt construction unit 124 of the application services platform shown in FIG. 1. The prompt construction unit 124 formats the prompt for the language model 126 and submits the prompt to the language model 126. The prompt construction unit 124 includes a prompt formatting unit 402 and a prompt submission unit 406.

The prompt formatting unit 402 receives the root cause failure category output by the graphical language model 128 as an input from the request processing unit 122. The request processing unit 122 generates a natural language prompt to generate a root cause analysis based on the root cause failure category. The natural language prompt includes instructions to the language model 126 to include a description for the root cause problem and how to address the root cause problem. In some implementations, the natural language prompt instructs the language model 126 to provide step-by-step instructions for addressing the root cause problem. A technical benefit of this approach is that the root cause failure category is provided to the language model 126, which avoids situations in which the language model 126 hallucinates the root cause failure that causes the build problem or software runtime problem.

The prompt submission unit 406 submits the formatted prompt to the language model 126. The language model 126 analyzes the prompt and generates a response based on the prompt. The response to the prompt includes a root cause failure analysis that identifies the root cause of the problem experienced during the build or during the runtime of the software. The prompt submission unit 406 submits the response generated by the language model to the moderation services 168 to ensure that the response does not include any potentially objectionable or offensive content. The prompt construction unit 124 halts the processing of the response in response to the moderation services 168 determining that the prompt includes potentially objectionable or offensive content. The moderation services 168 generates a blocked content notification in response to determining that the generated content includes potentially objectionable or offensive content, and the notification is provided to the native application 114 or the web application 190 so that the notification can be presented to the user on the client device 105. The root cause failure analysis is presented to an administrator to analyze whether the content generated by the language model 126 includes potentially objectionable or offensive content. If the moderation services 168 does not identify any issues with the generated content output by the language model 126 in response to the prompt, the prompt submission unit 406 provides the generated output to the request processing unit 122. The request processing unit 122 provides the generated content to the native application 114 or the web application 190 depending upon which application was the source of the request to generate content.

FIG. 5 is a diagram of example user interface 505 of an application that implements the techniques described herein. The example user interface 505 enables a user to view the root cause failure analysis generated according to the techniques herein. The user interface 505 also includes controls that enables the user to search for the root cause failure analysis for previous build problems and/or software build problems that may assist the user in analyzing a current problem. This historical data is stored in the build-related prompt datastore 136 as discussed in the preceding examples.

Figure 6A:
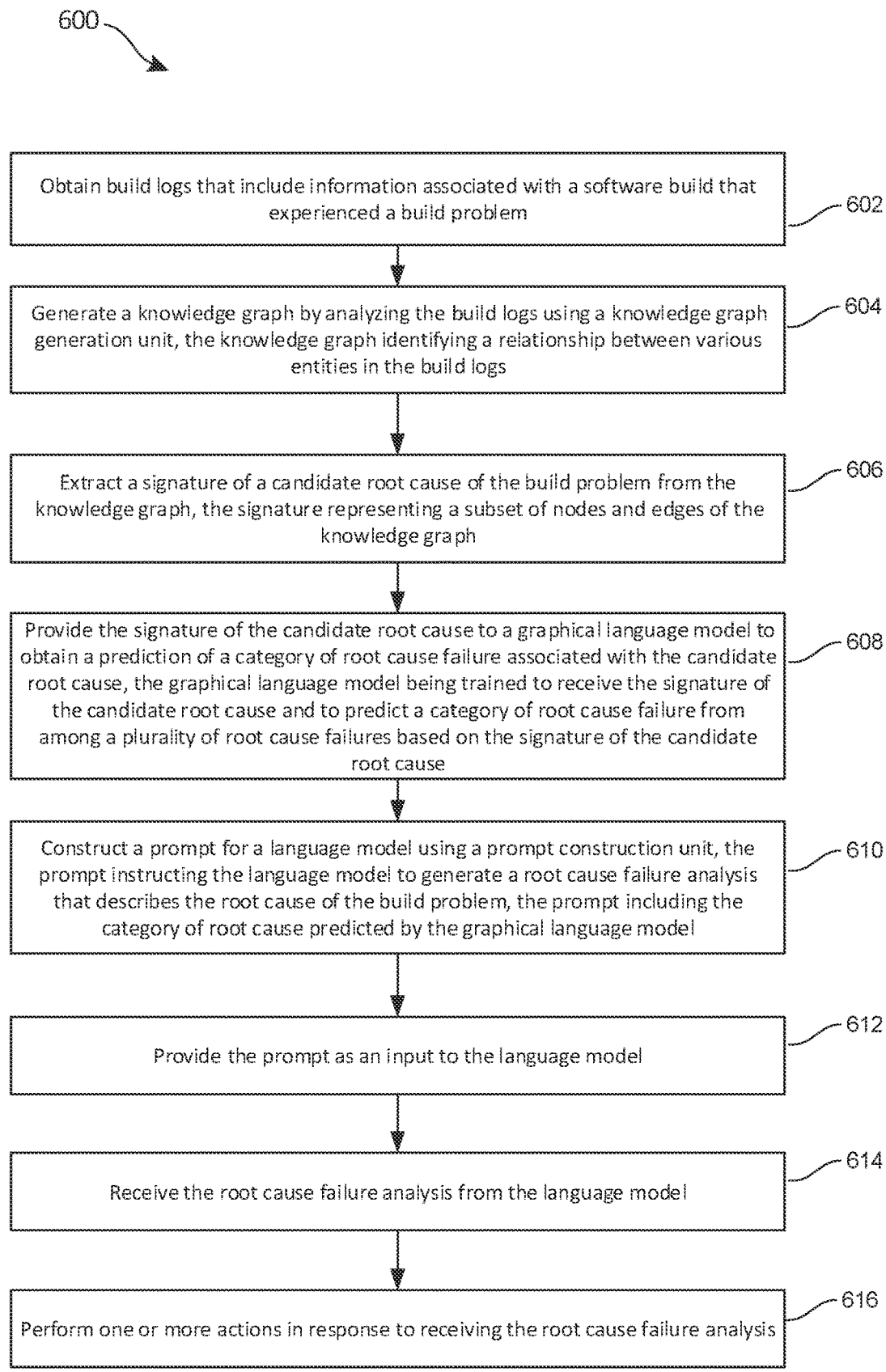
FIG. 6A is a flow chart of an example process for performing a root cause analysis according to the techniques disclosed herein.

FIG. 6A is a flow chart of an example process 600 for performing a root cause analysis according to the techniques disclosed herein. The process 600 can be implemented by the application services platform 110 shown in the preceding examples.

The process 600 includes an operation 602 of obtaining build logs 134 that include information associated with a software build that experienced a build problem and an operation 604 of generating a knowledge graph 130 by analyzing the build logs 134 using a knowledge graph generation unit 132, the knowledge graph 130 identifying a relationship between various entities in the build logs. The knowledge graph 130 identifies the relationship between various entities in the build logs 134. The knowledge graph generation unit 132 generates the knowledge graph 130 based on the build logs 134.

The process 600 includes an operation 606 of extracting a signature of a candidate root cause of the build problem from the knowledge graph 130. The signature represents a subset of nodes and edges of the knowledge graph 130. The signature extraction unit 138 extracts the signature from the knowledge graph 130 as discussed in the preceding examples.

The process 600 includes an operation 608 of providing the signature of the candidate root cause to a graphical language model 128 to obtain a prediction of a category of root cause failure. The graphical language model 128 is trained to receive the signature of the candidate root cause and to predict a category of root cause failure from among a plurality of root cause failures based on the signature of the candidate root cause.

The process 600 includes an operation 610 of constructing a prompt for a language model using a prompt construction unit 124, the prompt instructing the language model 126 to generate a root cause failure analysis that describes the root cause of the build problem, the prompt including the category of root cause predicted by the graphical language model 128.

The process 600 includes an operation 612 of providing the prompt as an input to the language model 126 and an operation 614 of receiving the root cause failure analysis from the language model 126. The prompt includes the category of root cause predicted by the graphical language model 128.

The process 600 includes an operation 616 of performing one or more actions in response to receiving the root cause failure analysis. The one or more actions may include causing the native application 114 and/or the web application 190 to present the root cause analysis on a user interface of the application. The one or more actions may also include storing the natural language prompt and the root cause analysis in the build-related datastore 136 as discussed above.

Figure 6B:
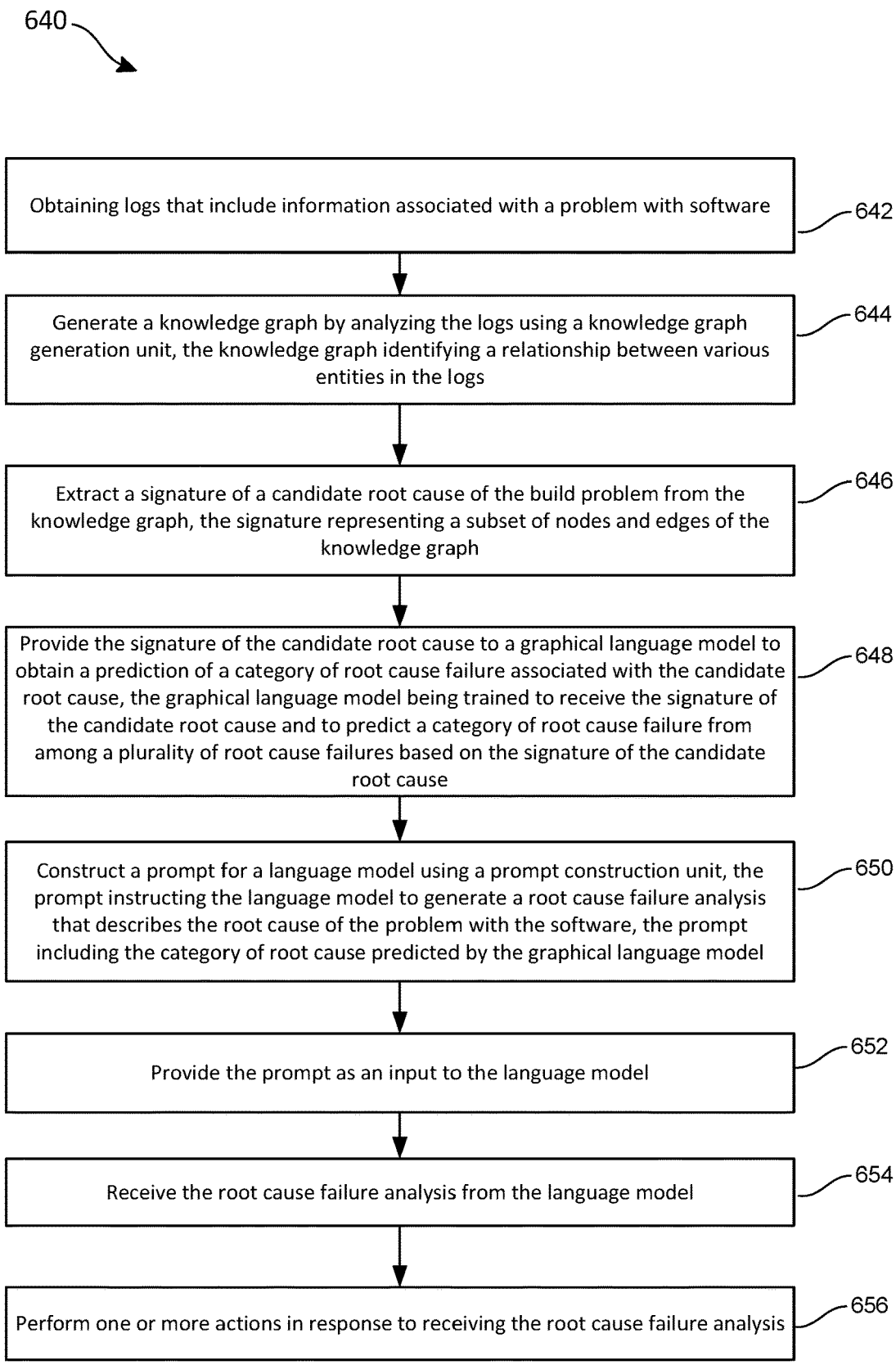
FIG. 6B is a flow chart of another example process for performing a root cause analysis according to the techniques disclosed herein.

FIG. 6B is a flow chart of another example process 640 for performing a root cause analysis according to the techniques disclosed herein. The process 640 can be implemented by the application services platform 110 shown in the preceding examples.

The process 640 includes an operation 642 of obtaining logs that include information associated with a problem with software and an operation 644 of analyzing the logs to generate a knowledge graph 130 based on the logs. The logs may be the build logs 134 discussed in the preceding examples that include information indicative of a root cause of a build problem. The logs include information output as the software is being executed and include information indicative of a root cause of a runtime error that occurred while the software was being executed by the application services platform 110. The knowledge graph 130 identifies the relationship between various entities in the logs. The knowledge graph generation unit 132 generates the knowledge graph 130 based on the logs.

The process 640 includes an operation 646 of extracting a signature of a candidate root cause of the problem from the knowledge graph 130. The signature represents a subset of nodes and edges of the knowledge graph 130. The signature extraction unit 138 extracts the signature from the knowledge graph 130 as discussed in the preceding examples.

The process 640 includes an operation 648 of providing the signature of the candidate root cause to a graphical language model 128 to obtain a prediction of a category of root cause failure. The graphical language model 128 is trained to receive the signature of the candidate root cause and to predict a category of root cause failure from among a plurality of root cause failures based on the signature of the candidate root cause.

The process 640 includes an operation 650 of constructing a prompt for a language model using a prompt construction unit 124, the prompt instructing the language model 126 to generate a root cause failure analysis that describes the root cause of the problem with the software, the prompt including the category of root cause predicted by the graphical language model 128.

The process 640 includes an operation 652 of providing the prompt as an input to the language model 126 and an operation 654 of receiving the root cause failure analysis from the language model 126. The prompt includes the category of root cause predicted by the graphical language model 128.

The process 640 includes an operation 656 of performing one or more actions in response to receiving the root cause failure analysis. The one or more actions may include causing the native application 114 and/or the web application 190 to present the root cause analysis on a user interface of the application. The one or more actions may also include storing the natural language prompt and the root cause analysis in the build-related datastore 136 or another similar database as discussed above.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
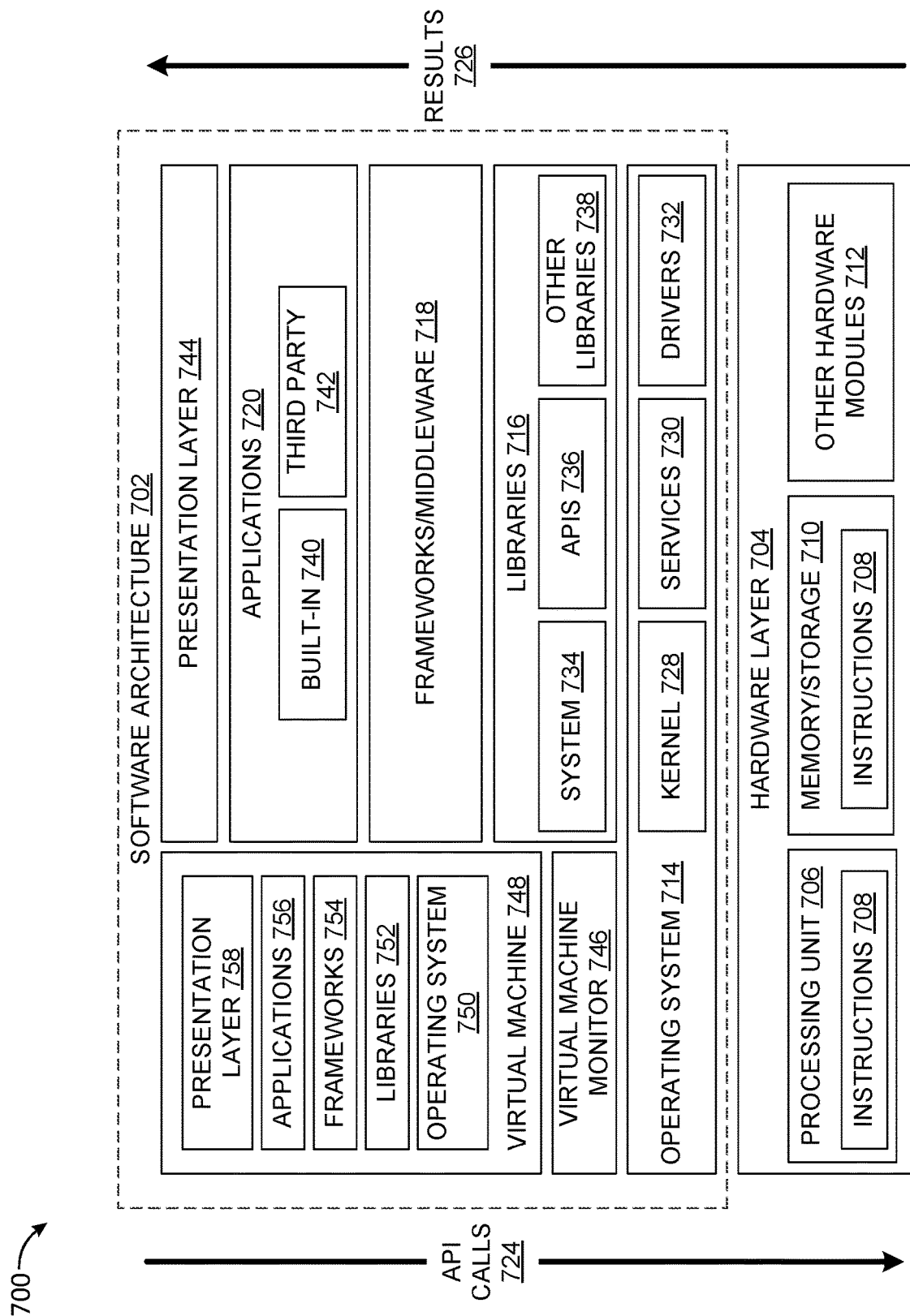
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
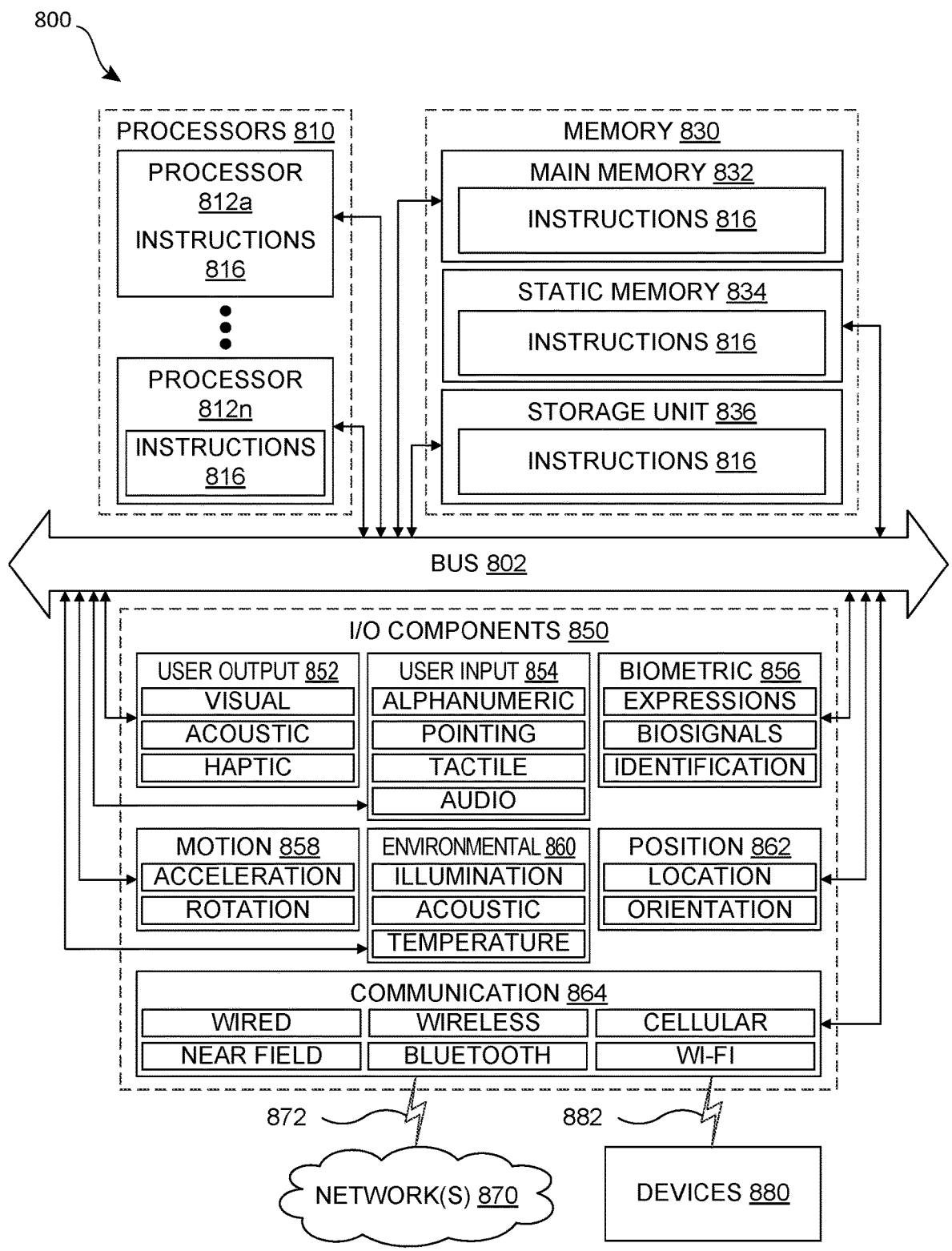
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable storage medium storing executable instructions that, when executed, cause the processor alone or in combination with other processors to perform operations of:
obtaining build logs that include information associated with a software build that experienced a build problem;
generating a knowledge graph by analyzing the build logs using a knowledge graph generation unit, the knowledge graph identifying a relationship between various entities in the build logs;
extracting a signature of a candidate root cause of the build problem from the knowledge graph, the signature representing a subset of nodes and edges of the knowledge graph;
providing the signature of the candidate root cause to a graphical language model to obtain a prediction of a category of root cause failure, the graphical language model being trained to receive the signature of the candidate root cause and to predict a category of root cause failure from among a plurality of root cause failures based on the signature of the candidate root cause;
constructing a prompt for a language model using a prompt construction unit, the prompt instructing the language model to generate a root cause failure analysis that describes the root cause of the build problem, the prompt including the category of root cause predicted by the graphical language model;
providing the prompt as an input to the language model;
receiving the root cause failure analysis from the language model; and
performing one or more actions in response to receiving the root cause failure analysis.

2. The data processing system of claim 1, wherein extracting the signature of the candidate root cause of the build problem from the knowledge graph further comprises:
filtering out nodes and edges of the knowledge graph that do not appear more than a threshold number of times in the build logs.

3. The data processing system of claim 1, wherein the language model is a Large Language Model (LLM).

4. The data processing system of claim 1, wherein constructing the prompt for the language model further comprises including instructions to the language model to include a description of the root cause failure and instructions for addressing the root cause failure.

5. The data processing system of claim 1, wherein the machine-readable storage medium further includes instructions configured to cause the processor alone or in combination with other processors to perform operations of:
providing the root cause analysis to a moderation service to analyze the root cause analysis for potentially objectionable content; and
discarding the root cause analysis in response to the moderation service determining that the root cause analysis includes potentially objectionable content.

6. The data processing system of claim 1, wherein performing the one or more actions in response to receiving the root cause failure analysis further comprises:
causing a user interface of an application of a client device to present the root cause failure analysis.

7. The data processing system of claim 1, wherein performing the one or more actions in response to receiving the root cause failure analysis further comprises:
storing the root cause analysis and prompt in a build-related prompt datastore; and
providing a user interface for searching the build-related prompt datastore.

8. A method implemented in a data processing system for performing a root cause analysis, the method comprising:
obtaining build logs that include information associated with a software build that experienced a build problem;
generating a knowledge graph by analyzing the build logs using a knowledge graph generation unit, the knowledge graph identifying a relationship between various entities in the build logs;
extracting a signature of a candidate root cause of the build problem from the knowledge graph, the signature representing a subset of nodes and edges of the knowledge graph;
providing the signature of the candidate root cause to a graphical language model to obtain a prediction of a category of root cause failure, the graphical language model being trained to receive the signature of the candidate root cause and to predict a category of root cause failure from among a plurality of root cause failures based on the signature of the candidate root cause;
constructing a prompt for a language model using a prompt construction unit, the prompt instructing the language model to generate a root cause failure analysis that describes the root cause of the build problem, the prompt including the category of root cause predicted by the graphical language model;

providing the prompt as an input to the language model;
receiving the root cause failure analysis from the language model; and
performing one or more actions in response to receiving the root cause failure analysis.

9. The method of claim 8, wherein extracting the signature of the candidate root cause of the build problem from the knowledge graph further comprises:
filtering out nodes and edges of the knowledge graph that do not appear more than a threshold number of times in the build logs.

10. The method of claim 8, wherein the language model is a Large Language Model (LLM).

11. The method of claim 8, wherein constructing the prompt for the language model further comprises including instructions to the language model to include a description of the root cause failure and instructions for addressing the root cause failure.

12. The method of claim 8, further comprising:
providing the root cause analysis to a moderation service to analyze the root cause analysis for potentially objectionable content; and
discarding the root cause analysis in response to the moderation service determining that the root cause analysis includes potentially objectionable content.

13. The method of claim 8, wherein performing the one or more actions in response to receiving the root cause failure analysis further comprises:
causing a user interface of an application of a client device to present the root cause failure analysis.

14. The method of claim 8, wherein performing the one or more actions in response to receiving the root cause failure analysis further comprises:
storing the root cause analysis and the prompt in a build-related prompt datastore; and
providing a user interface for searching the build-related prompt datastore.

15. A data processing system comprising:
a processor; and
a machine-readable storage medium storing executable instructions that, when executed, cause the processor alone or in combination with other processors to perform operations of:
obtaining logs that include information associated with a problem with software;
generating a knowledge graph by analyzing the logs using a knowledge graph generation unit, the knowledge graph identifying a relationship between various entities in the logs;
extracting a signature of a candidate root cause of the problem from the knowledge graph, the signature representing a subset of nodes and edges of the knowledge graph;
providing the signature of the candidate root cause to a graphical language model to obtain a prediction of a category of root cause failure, the graphical language model being trained to receive the signature of the candidate root cause and to predict a category of root cause failure from among a plurality of root cause failures based on the signature of the candidate root cause;
constructing a prompt for a language model using a prompt construction unit, the prompt instructing the language model to generate a root cause failure analysis that describes the root cause of the problem with the software, the prompt including the category of root cause predicted by the graphical language model;
providing the prompt as an input to the language model;
receiving the root cause failure analysis from the language model; and
performing one or more actions in response to receiving the root cause failure analysis.

16. The data processing system of claim 15, wherein extracting the signature of the candidate root cause of the problem from the knowledge graph further comprises:
filtering out nodes and edges of the knowledge graph that do not appear more than a threshold number of times in the logs.

17. The data processing system of claim 15, wherein the language model is a Large Language Model (LLM).

18. The data processing system of claim 15, wherein constructing the prompt for the language model further comprises including instructions to the language model to include a description of the root cause failure and instructions for addressing the root cause failure.

19. The data processing system of claim 15, wherein the machine-readable storage medium further includes instructions configured to cause the processor alone or in combination with other processors to perform operations of:
providing the root cause analysis to a moderation service to analyze the root cause analysis for potentially objectionable content; and
discarding the root cause analysis in response to the moderation service determining that the root cause analysis includes potentially objectionable content.

20. The data processing system of claim 15, wherein the logs include runtime error information associated with the software.

* * * * *